United States Patent
Jacobson et al.

(10) Patent No.: US 8,204,060 B2
(45) Date of Patent: *Jun. 19, 2012

(54) METHOD AND SYSTEM FOR FACILITATING FORWARDING A PACKET IN A CONTENT-CENTRIC NETWORK

(75) Inventors: Van L. Jacobson, Woodside, CA (US); James D. Thornton, Redwood City, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 285 days.

This patent is subject to a terminal disclaimer.

(21) Appl. No.: 12/640,968

(22) Filed: Dec. 17, 2009

(65) Prior Publication Data

US 2010/0195655 A1    Aug. 5, 2010

Related U.S. Application Data

(60) Provisional application No. 61/148,871, filed on Jan. 30, 2009.

(51) Int. Cl.
*H04L 12/56* (2006.01)
(52) U.S. Cl. .................................... 370/392; 370/395.3

(58) Field of Classification Search ................ 370/389, 370/392, 395.3
See application file for complete search history.

(56) References Cited

U.S. PATENT DOCUMENTS

| 5,870,605 | A | | 2/1999 | Bracho | |
|---|---|---|---|---|---|
| 6,052,683 | A | * | 4/2000 | Irwin | 707/758 |
| 7,382,787 | B1 | * | 6/2008 | Barnes et al. | 370/401 |
| 2005/0043060 | A1 | * | 2/2005 | Brandenberg et al. | 455/558 |
| 2007/0239892 | A1 | * | 10/2007 | Ott et al. | 709/242 |
| 2010/0268782 | A1 | * | 10/2010 | Zombek et al. | 709/206 |

FOREIGN PATENT DOCUMENTS

| WO | 03005288 A2 | 1/2003 |
|---|---|---|
| WO | 03005288 A3 | 1/2003 |
| WO | 03049369 A2 | 6/2003 |

* cited by examiner

*Primary Examiner* — Dang Ton
*Assistant Examiner* — Ryan Kavleski
(74) *Attorney, Agent, or Firm* — Shun Yao; Park, Vaughan, Fleming & Dowler LLP (57) ABSTRACT

One embodiment provides a system that facilitates forwarding a packet. During operation, the system receives a packet with a hierarchically structured variable-length identifier (HSVLI). The system then performs a lookup at a forwarding engine based at least on the packets HSVLI. The system further makes a forwarding decision based on the lookup.

18 Claims, 5 Drawing Sheets

METHOD AND SYSTEM FOR FACILITATING FORWARDING A PACKET IN A CONTENT-CENTRIC NETWORK

RELATED APPLICATION

This application claims the benefit of U.S. Provisional Application No. 61/148,871, entitled "OPTIMIZED CCN FORWARDING BY ADAPTATION OF EXISTING LOOKUP ENGINES FOR VARIABLE-LENGTH CONTENT NAMES," by inventors Van Jacobson and James Thornton, filed 30 Jan. 2009.

The subject matter of this application is related to the subject matter in the following applications:
U.S. patent application Ser. No. 12/123,344, entitled "VOICE OVER CONTENT-CENTRIC NETWORKS," by inventors Paul Stewart, Van Jacobson, Michael Plass, and Diana Smetters, filed 19 May 2008;
U.S. patent application Ser. No. 12/332,560, entitled "METHOD AND APPARATUS FOR FACILITATING COMMUNICATION IN A CONTENT-CENTRIC NETWORK," by inventor Van Jacobson, filed 11 Dec. 2008;
U.S. patent application Ser. No. 12/638,478, entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James Thornton, filed 15 Dec. 2009;
U.S. patent application Ser. No. 12/565,005, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009; and
U.S. patent application Ser. No. 12/603,336, entitled "ADAPTIVE MULTI-INTERFACE USE FOR CONTENT NETWORKING," by inventors Van L. Jacobson and James D. Thornton, filed 21 Oct. 2009;
the disclosures of which are incorporated by reference in their entirety herein.

BACKGROUND

1. Field

The present disclosure relates generally to communication networks. More specifically, the present disclosure relates to a method and system for forwarding packets in a content-centric network.

2. Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of content can only receive the content by explicitly requesting the content from an address (e.g., IP address) closely associated with a physical object or location. This restrictive addressing scheme is becoming progressively inadequate for meeting the ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today's ubiquitous, relentlessly growing Internet. People now expect a lot more from the Internet than what the ARPAnet was designed for. Ideally, an Internet user should have access to any content, anywhere, at any time. Such access is difficult to guarantee with the current location/device-binding IP protocol.

In the current technology, forwarding is the process by which a node in a packet-switched network transmits a packet from a source address to a fixed-length destination address. An Internet Protocol (IP) forwarder is typically called a router. The router receives a packet at one of its input ports (i.e., network interface) and uses a lookup engine to find an output port to which the packet should be forwarded based on the packet's destination address. Subsequently, the router sends the packet to the output port, which is usually different from the input port.

Under the current IP-based naming scheme, the identity of a host storing content is often implicit in the name which indicates the corresponding content. For example, a browser can access a human-readable host name in a uniform resource locator (URL) form by contacting the machine that hosts the web page corresponding to the URL. However, this contact requires a Domain Name Server (DNS) to translate the human-readable host name into an IP address (e.g., 209.34.123.178). In current networking devices (such as IP routers and Ethernet switches), there is no way to forward a packet without knowing its destination address.

SUMMARY

One embodiment provides a system that facilitates forwarding a packet. During operation, the system receives a packet with a hierarchically structured variable-length identifier (HSVLI). The system then performs a lookup at a forwarding engine based at least on the packet's HSVLI. The forwarding engine is implemented using a hardware-based exact-match lookup engine, a hardware-based longest-prefix-match lookup engine, or both. Performing the lookup involves searching for matches against at least one of: a content store, a pending interest table, and a forwarding information base. The system further makes a forwarding decision based on the lookup.

In a variation on this embodiment, the HSVLI indicates a piece of content and is hierarchically structured, comprising contiguous components ordered from a most general level to a most specific level. Additionally, the length of a respective identifier is not fixed.

In a further embodiment, the forwarding engine includes a lookup table containing entries from the content store, pending interest table, and forwarding information base.

In a variation on this embodiment, the system determines whether the packet contains an interest or a piece of content corresponding to the HSVLI.

In a variation on this embodiment, in response to the packet containing an interest for a piece of content and the lookup resulting a match in a content store, the system transmits a piece of content previously stored in the content store towards the source of the interest.

In a variation on this embodiment, in response to the packet containing an interest for a piece of content and the lookup resulting a match in a pending interest table but not a match in a content store, the system updates the pending interest table to include the packet's input interface with the corresponding pending-interest entry.

In a variation on this embodiment, in response to the packet containing an interest for a piece of content and the lookup resulting a match in a forwarding information base but not a match in a content store or a pending interest table, the system forwards the packet to one or more interfaces corresponding to the match in the forwarding information base.

In a variation on this embodiment, in response to the packet containing a piece of content and the lookup resulting in a match in a pending interest table, the system forwards the packet to an interface corresponding to the match in the pending interest table. The system further stores a copy of the packet in a content store and removes a corresponding pending interest in the pending interest table.

BRIEF DESCRIPTION OF THE FIGURES

In the figures, like reference numerals refer to the same figure elements.

DETAILED DESCRIPTION

Overview

In embodiments of the present invention, the problem of forwarding packets in a content-centric network is solved by using a lookup engine that combines multiple lookup tables to forward content or the interest thereof. Specifically, a content-centric routing engine combines forwarding information from several types of lookup tables and provides a synergistic forwarding scheme based on a packet's hierarchically structured variable-length identifier. The following section describes content-centric networks and content names. Subsequent sections provide more detailed description of the forwarding mechanism in a content-centric network.

In the following description, a "content consumer" or "consumer" refers to an entity that requests or receives content. A "content provider" or "provider" refers to an entity that provides content.

The terms "interest" or "query" refer a request for some content. An interest packet encodes a special form of query that expresses what content is desired (from the collection of content that might be in the network) and optionally what content is not desired (content that the requester already has or that is known to be irrelevant in the context). A key part of the query is a name prefix for the desired content. Due to the hierarchical structure of content names, also referred to as hierarchically structured variable-length identifiers (HSVLSs), which are explained in the following section, such a prefix identifies a (potential) collection of content. Other parts of a query may narrow down what content is desired from within that collection. A forwarder is responsible for transmitting content data that satisfies the interest or to transmit the interest itself to one or more next-hop destinations that are likely to be closer to some source for the corresponding content.

The terms "content," "content data," "content packet," and "data packet" refer to a unit of content. In a CCN, content packets are self-identifying: they carry the full content name, though the portion of the name which can be a hash of the content itself may be implicit. A forwarder is typically responsible for forwarding the content data towards a source of the corresponding interest, while typically retaining a cache copy that can be used to satisfy future Interests.

The term "Face" refers to an interface on a CCN forwarder that couples to applications or networks. A Face can be based on either hardware or software. Such CCN interfaces are referred to as "Faces" so that they can be distinguished from the common meaning of interface as a physical network interface in router terminology. Interest and content packets are received and transmitted through Faces. A Face may couple to a single application, a single remote node over a point-to-point network connection, or a collection of nodes such as a broadcast or multicast group in a network.

The terms "forwarding information base," "FIB," and "forwarding table" refer to a data structure that allows lookup of a name prefix to determine where to send an interest. A look up in a CCN FIB typically returns a reference to one or more output Faces, since an interest packet or content packet is allowed to be forwarded to multiple Faces.

The terms "content store" and "CS" refer to a data structure that holds content packets so that they can be delivered in response to future matching interests. The use of named data in CCN is designed to decouple content from its location so that it is easy to trade storage for bandwidth at any point in the network. A CCN content store replaces the queue-buffer memory associated with output interfaces in a conventional IP router. Rather than storing packets at an outgoing interface when there is congestion (which is done in IP routers), a CCN forwarder stores data packets in the CS. The CS may be implemented as a distributed memory hierarchy, which is simplified by the fact that each packet is self-identifying and immutable so that many copies may exist without coordination.

The terms "pending interest table" and "PIT" refer to a data structure that allows a lookup based on a CCN name prefix in a content packet to identify corresponding pending interests. Based on the lookup result, the CCN forwarder can determine where and how to forward a content packet. The PIT stores for each pending interest a reference to a list of Faces that have provided the interest. In other words, the PIT maintains a record that indicates how to transmit a content packet to the sources that have previously generated a corresponding interest, which remains pending until satisfied by one or more content packets.

Content-Centric Networks and Content Name

Content-centric networks bring a new approach to content transport. Instead of having network traffic viewed at the application level as end-to-end conversations over which content travels, content is requested or returned based in part on the name given to it. Embodiments of this invention provide a CCN forwarder that forwards an interest toward the content-hosting node(s), and forwards the corresponding content back to the content consumer. The CCN forwarding engine combines a forwarding information base, a content store, and a pending interest table to facilitate forwarding of both interests and content. Unlike conventional topology-based forwarding mechanisms which require spanning-tree-based routing (such as those implemented in IP routers), a CCN forwarding engine can forward packets to multiple output Faces while ensuring loop-free forwarding.

In a CCN, content includes any form of data such as text, images, video, and/or audio. A content consumer or provider can be a person at a computer or an automated process such as an application. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

A CCN packet typically corresponds to an interest in a piece of content or a piece of content that corresponds to an interest. Regardless of whether the packet payload is an interest or the content data, a packet is identified by a hierarchically structured variable-length identifier (HSVLI). This HSVLI is also the name of the corresponding content. For example, HSVLI "abcd/bob/papers/ccn/news" represents the name of the content and identifies the corresponding packet(s). This HSVLI, also referred to as "content name," refers to the "news" article from the "ccn" collection of papers for a user named "Bob" at the organization named "ABCD."

To request a piece of content, a node expresses (e.g., broadcasts) an interest in that content by the content's name (i.e., the HSVLI). A CCN forwarder is responsible for forwarding the interest toward the node(s) that have the content, and for delivering the content back to the requester. Ideally, the CCN forwarding infrastructure intelligently propagates the interest to the prospective nodes that are likely to have the information and then carries available content back along the path which the interest traversed.

Note that conventional packet forwarding is based on addresses assigned to nodes (or interfaces of nodes). For example, in IP addressing, a hierarchical division of addresses is used so that the first portion of an IP address identifies a network, a later portions identify a sub-network within that network, and the end of the address identifies a particular host within a sub-network. This arrangement allows the responsibility for assigning unique addresses to be delegated and thereby distributed so that the Internet can scale to worldwide size. It also enables scaling by limiting the amount of information an IP router needs to process when forwarding a packet to an output port.

In contrast, in a CCN, the hierarchical structure of an HSVLI is advantageous over the hierarchical structure of an IP address (or other types of addresses, such as Ethernet MAC address). An interest can describe the structure explicitly through the name rather than implicitly through an IP routing table entry, which includes a subnet mask. Thus, with an HSVLI, a naming mistake in the hierarchy can be detected through inspection, whereas an IP-based subnet mask mistake might route a packet to the wrong address and is more difficult to detect.

An HSVLI, as part of an interest packet, can be matched by any content name which has the HSVLI as a prefix. For example, an interest indicating "/parc.com/van/presentation.pdf" can be matched by content names "/parc.com/van/presentation.pdf/p1" and "/parc.com/van/presentation.pdf/p2." Any node that receives the interest and has content matching the interest can respond with the content. Content that matches an interest is said to "consume" that interest. As a result, if a content consumer wishes to continue receiving content, the corresponding interest is re-expressed so that additional content packets can be delivered to the consumer. Content can also be matched by multiple, sometimes different, interests.

Figure 1:
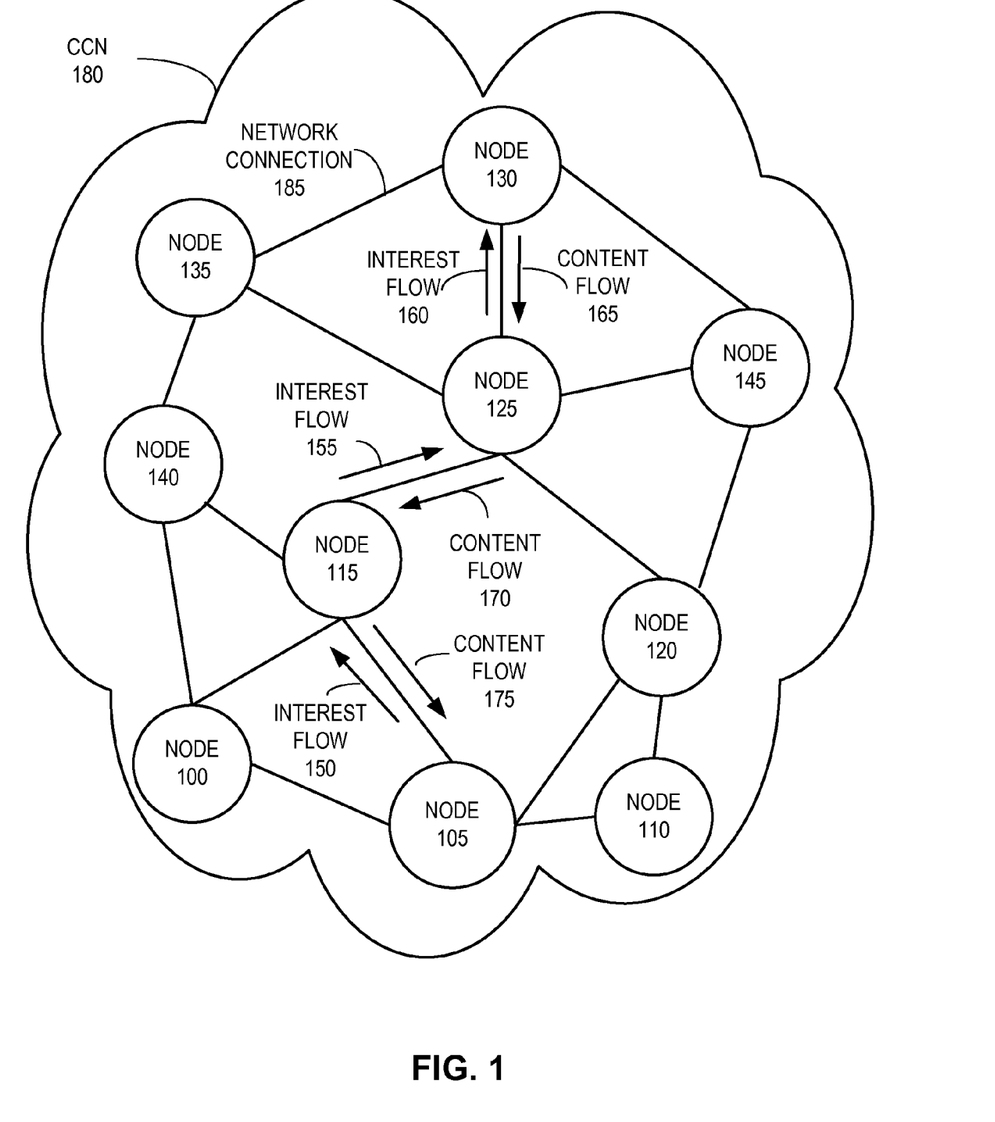
FIG. 1 illustrates an exemplary architecture of a content-centric network (CCN), in accordance with an embodiment.

FIG. 1 illustrates an exemplary architecture of a CCN, in accordance with an embodiment of the present invention. In this example, a CCN 180 includes 100-145. Each node in the network is coupled to one or more other nodes. Network connection 185 is an example of such a connection. Although the network connections are shown as solid lines, each line could also represent sub-networks or super-networks which can couple two nodes. A network connection can be broadband, wireless, telephonic, satellite, or any type of connection. A node can be any entity, such as a host (computer system), a cluster or network of hosts, an application, and/or a device that can generate interests or originate content.

A consumer can generate an interest in a piece of content and then send that interest to a node in CCN 180. The corresponding content can be stored at a node in CCN 180 by a publisher or content provider, who can be located inside or outside the network. For example, in FIG. 1, the interest in a piece of content originates at node 105. If the content is not available at node 105, the interest is forwarded to one or more nodes coupled to node 105, such as node 115. If node 115 does not store a copy of the requested content, node 115 forwards the interest to node 125, which further forwards the interest to node 130. The route traversed by the interest is indicated by interest flows 150, 155, and 160 in FIG. 1. Since node 130 stores a copy of the content, the content then traces back the path traversed by the interest (content flows 165, 170, and 175) until it reaches node 105, where the content is delivered. Each node involved in the interest flow or content flow can perform an optional authentication operation on the interest or content.

In CCN 180, any number of intermediate nodes (nodes 100-145) in the path between a content holder (node 130) and the interest-generating node (node 105) can participate in caching (storing) local copies of the content as the content travels across the network. The content can be stored in a respective node's content store (CS). Caching reduces the network load for a second subscriber located in proximity to other subscribers by implicitly sharing access to the locally cached content.

CCN Forwarder Architecture

In one embodiment, a CCN forwarding engine is loaded with entries in the CS, PIT, and FIB. The lookup results are subject to assigned priorities, so that the match from the desired lookup table is used by the forwarding engine. Appropriate post-lookup processing is then performed on the match results, including additional matching checks or query processing.

Figure 2:
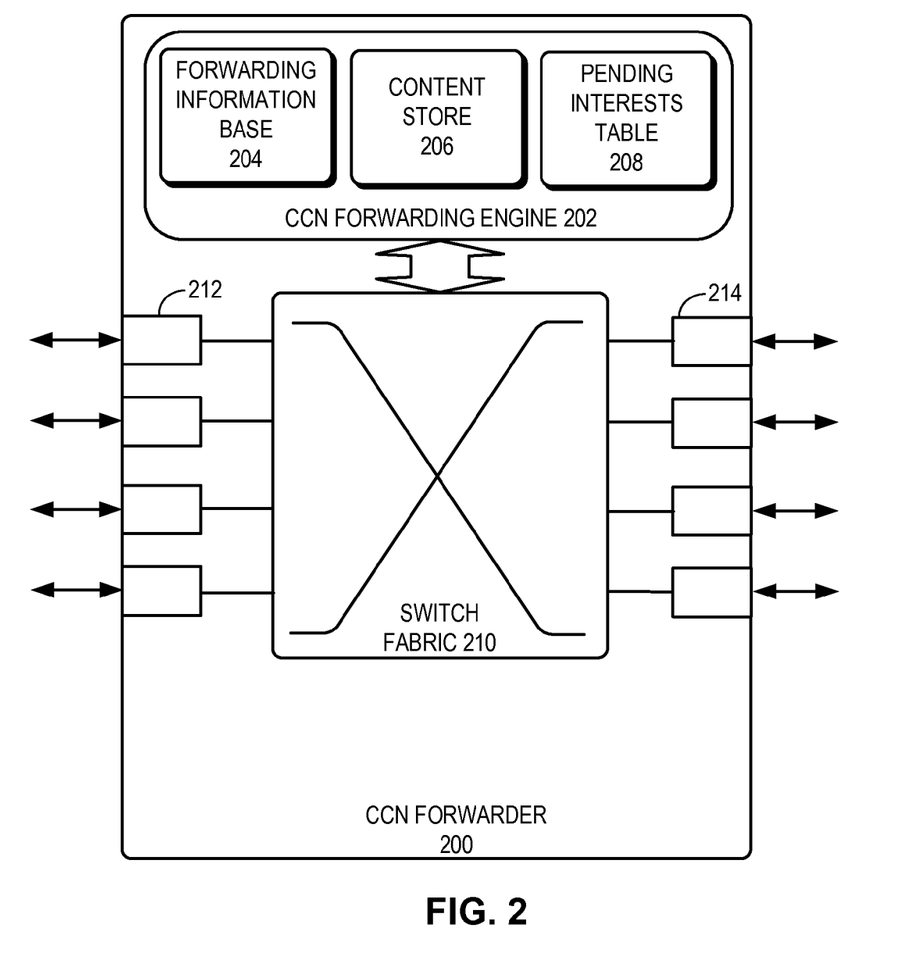
FIG. 2 presents an exemplary CCN forwarder for forwarding CCN packets with HSVLIs, in accordance with one embodiment of the present invention.

FIG. 2 presents an exemplary CCN forwarder for forwarding CCN packets with HSVLIs, in accordance with one embodiment of the present invention. In this example, a CCN forwarder 200 includes a number of Faces, such as Face 212 and 214. A switch fabric 210 inter-couples these Faces.

A CCN forwarding engine 202 controls switch fabric 210 and determines how to process or forward an incoming packet. Within CCN forwarding engine 202 are a FIB 204, a CS 206, and a PIT 208.

As described above in conjunction with FIG. 1, a content consumer typically generates and transmits an interest to its default next-hop node (assuming that the consumer does not already have a copy of the content). The next-hop node processes the interest packet, and, depending on whether the node stores a copy of the content or has previously forwarded a similar interest, the node may return the content to the consumer (typically via the same Face on which the interested arrives), adding the corresponding input Face to the PIT, or forward the interest based on a FIB lookup. The detailed operation of a respective CCN forwarder, such as CCN forwarder 200, is described below.

When a packet is received from an input Face, CCN forwarding engine 202 first determines whether the packet is an interest packet or content packet. If the packet contains an interest, CCN forwarding engine 202 first searches CS 206 to determine whether there is a piece of content that matches the HSVLI in the interest packet. In one embodiment, CS 206 can be indexed by the content names, which correspond to an interest packet's HSVLI. If there is a hit in the CS (i.e., there is a piece of content that matches the interest packet), CCN forwarding engine 202 then retrieves the content from CS 206, and transmits the content onto the same Face on which the interest arrives. If CS 206 does not store a copy of the requested content, forwarding engine 202 then searches PIT 208. If a hit is found in PIT 208, that means a previous interest in the same content has been forwarded. Correspondingly, forwarding engine 202 adds the input Face from which the interest arrives to PIT 208, so that when the content is returned from the network the content can be transmitted back the source of the interest.

If PIT 208 does not contain a matching interest, FIB 204 is then searched with the HSVLI prefix of the interest packet. In one embodiment, forwarding engine 202 performs a longest-prefix-match lookup in FIB 204 based on the prefixes of the interest packet's HSVLI. Longest-prefix-match lookup is important in forwarding packets with HSVLIs. For example, an HSVLI indicating an interest in "/parc/home/smetters" will match both "/parc/home/smetters/test.txt" and "/parc/home/smetters/bar.txt." Note that a prefix indicates one or more contiguous components in an HSVLI beginning with a component at the most general level. For example, "/a/b" is a prefix of "/a/b/c/d," where "/a" is at the most general level and "a," "b," "c," and "d" are contiguous components. An HSVLI can have more than one prefix. For example, "/a/b/c" is also prefix of "/a/b/c/d." The longest-prefix match, in terms of the number of name components, is considered the best because it is the most specific.

If a match is found in FIB 204, the lookup result would identify one or more Faces through which the interest packet can be forwarded. Accordingly, the interest packet is forwarded to these Face(s). In addition, the interest (i.e., its HSVLI) and the corresponding input Face are stored in PIT 208.

If no match is found in FIB 204, forwarding engine 202 may forward the interest packet to a default output Face. In one embodiment, FIG. 204 may produce a default result if there is no explicit match, either by an actual 0-length entry in FIB 204 which will produce a longest-prefix match if there is no other match, or by special processing. Such a default result might be treated as a match in FIB 204. Optionally, forwarding engine 202 may drop the interest packet if there is no explicit match in FIB 204.

When an incoming packet is a content packet, forwarding engine 202 first searches PIT 208 to determine whether there are any pending interests which can be satisfied by the content packet. If there is no match in PIT 208, which means that there is no currently pending interest for the corresponding content, forwarding engine 202 can drop the content packet. In one embodiment, forwarding engine 202 can optionally store a copy of the content in CS 206, so that if a matching interest is received in the future, the stored content can be timely supplied to the consumer.

If a match is found in PIT 208 for the received content packet, forwarding engine 202 can forward the content packet to the Faces associated with the corresponding HSVLI in the PIT match. That is, the content is transmitted to the Face(s) on which a pending interest has previously arrived. This way, forwarding engine 202 can ensure that a piece of content will trace back to the source of the pending interest. In addition, a copy of the content packet is stored in CS 206. Since each content packet is immutable and self-identifying, it is possible that the content packet is already stored in CS 206, in which case the storing step can be skipped (or alternatively has no effect on the state of CS 206).

After the content packet is forwarded to all the Faces identified in PIT 208, the corresponding interest is then removed from PIT 208, since the interest is satisfied at the node and no longer pending. In one embodiment, each interest-content pair can also function as a flow-control mechanism, in which case the content consumer can issue a new interest after a previously transmitted interest is satisfied.

Figure 3:
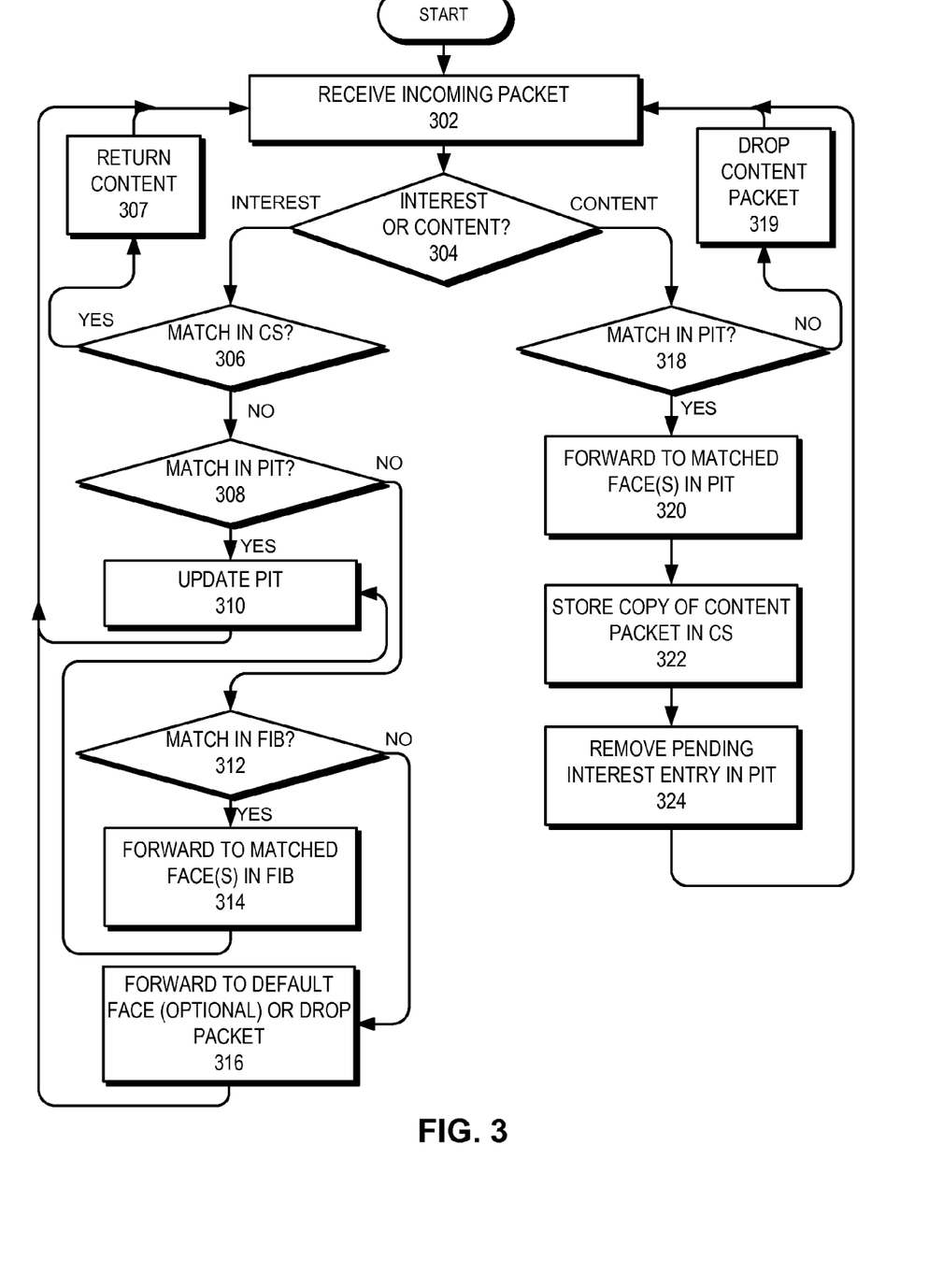
FIG. 3 presents a flowchart illustrating the process of facilitating forwarding a packet with an HSVLI, in accordance with an embodiment.

FIG. 3 presents a flowchart illustrating the process of forwarding a packet in a CCN in accordance with one embodiment of the present invention. During operation, the system receives an incoming packet (operation 302). The system then determines whether the packet is an interest packet or a content packet based on the packet's header or payload information (operation 304).

If the received packet is an interest packet, the system further performs a lookup in the CS and determines whether a piece of content matching the interest is found in the CS (operation 306). If a match is found, a copy of the content (or a copy of one or more content packets) is then returned to the source of the interest through the same Face on which the interest arrives (operation 307). If no match is found in the CS, the forwarding engine further performs a lookup in the PIT and determines whether there is already a pending interest for the same content in the PIT (operation 308). If there is a match in the PIT, the system updates the corresponding PIT entry to include the Face on which the interest arrives (operation 310), and continues to receive the next incoming packet.

If there is no match in the PIT for the interest packet, the system then performs a lookup in the FIB (operation 312). If a match is found, the system then forwards the interest packet to the matched Face(s) based on the FIB lookup (operation 314). The system further updates the PIT with the interest packet (operation 310) before receiving the next incoming packet. If no match is found in the FIB, the system can optionally forward the interest packet to a default Face, or drop the packet (operation 316).

If the received packet is a content packet (see operation 304), the system first performs a lookup in the PIT (operation 318). If there is no match in the PIT, which means that there is not pending interest for the incoming content packet, the system drops the content packet (operation 319). Optionally, the system can store a copy of the content packet in anticipation of future interest packets.

If there is a match in the PIT for the content packet, the system then forwards the content packet to the Face(s) returned by the PIT (operation 320). The system further stores a copy of the content packet in the CS (operation 322). Subsequently, the system removes the pending-interest entry in the PIT (operation 324).

Capacity Management

In any practical implementation of a CCN forwarder, the storage capacity of the internal data structures will be bounded so that they could possibly become full. Various storage-management schemes can be adopted to address these scenarios.

When the CS is full, it is a matter of policy as to what should be done with a newly arrived content packet. One policy would be to replace the least-recently used content packet(s) in the CS with the new arrival. It is also possible to implement much more complex policies, for example discarding newly arrived content packets with certain name prefixes, or discarding older packets signed with certain keys. In one CCN forwarding model, memory is dedicated to the CS rather than to packet queues, so if policy dictates that a content packet is not stored in the CS on arrival that content packet might not be forwarded anywhere. A content packet may contain an annotation from the publisher suggesting a maximum retention time after which the data is expected to be stale. Stale packets might be periodically discarded or be preferentially selected for replacement when the CS is full. Unlike in conventional IP forwarding where it is undesirable to have any data stored in packet queues, the CCN architecture is designed so that it is best to have as much data as possible stored in the CS so that future requests have a chance of being resolved locally. In other words, using memory that is already provided in the forwarder in case of congestion is better than not using it.

The system can implement various policies to handle the situation when the PIT is full. Unlike the content data in the CS, the lifetime of an interest is bounded as part of the design, so that old interests do not remain pending for consumers that have gone away. A consumer that does not receive the corresponding content can periodically retransmit the interest if the interest remains unsatisfied. Like the CS, in one embodiment, the PIT serves as a buffer for interests, in place of conventional packet queues. If policy dictates that an unsatisfied interest is not stored in the PIT, then that interest will not be forwarded anywhere, and matching content data that happens to come in will not be forwarded.

The FIB is the one forwarding data structure that is not updated automatically during forwarding operation. Updating the FIB can be performed off-line, either by manual configuration or the implementation of some routing protocol. If the FIB runs out of memory space, the connectivity of the forwarder might be limited. Note that the CCN FIB usage can potentially be reduced safely by consolidating entries with common prefixes, at the cost of some bandwidth for transmitting interests to additional destinations that will not yield better results.

Strategy

In some embodiments, the CCN forwarding engine employs a strategy layer that facilitates dynamic optimization of the CCN forwarder. For example, the system can use a forwarder with connectivity via two separate networks to engage in performance-based forwarding. The basic routing configuration can specify that a packet with certain HSVLI prefix can be forwarded to one or more Faces. Initially, such a packet might be forwarded to more than one Face. The strategy function can be used to observe that matching content is received more rapidly through one Face than others. Subsequently, the system might decide to forward interest packets with the same HSVLI prefix to this Face for faster content delivery. These dynamic optimization can be implemented asynchronously as a separate function that collects forwarding statistics, which can be used by the strategy layer to adjust the FIB.

Optimized CCN Forwarder Operation

As mentioned earlier, the CCN forwarding engine is loaded with entries in the CS, PIT, and FIB. The lookup results are subject to assigned priorities, so that the match from the desired lookup table is used by the forwarding engine. Post-lookup processing is then performed on the results, including additional matching checks or query processing.

Two additional features are unique in a CCN forwarding engine:

Multiple Entries. A CCN lookup table may have multiple entries for a given HSVLI (or prefix), unlike conventional forwarders where the forwarding table has only a single entry for each address (or prefix) to prevent looping. A match result in a CCN forwarding engine, therefore, can be a pointer to a list of actual content packets, interests, or Faces, depending on whether the lookup occurs in the CS, PIT, or FIB.

Priority Mechanism. In one embodiment, the CCN forwarding engine employs a specific priority to the match results when there may be multiple matches. Using a ternary content-addressable memory (TCAM), for example, a priority encoder can be used to select the first of multiple matching entries so the load order can be used to express the priority. Using a tree-based lookup, the system can explicitly attach priorities to multiple entries at the same node. Note that since the CCN forwarding engine combines the three lookup tables (CS, PIT, and FIB) and that these multiple matches will be for entries from different tables, each table may have a list of entries as described above.

In one embodiment, a CCN forwarding engine proceeds as follows:

1. A packet is received from the network through an input Face.

2. A lookup is performed on the packet prefix using the adapted common lookup engine. There is no difference in handling between the two CCN packet types (i.e., interest packet and content packet) up to this point.

3. Result of the lookup can be content packets from the CS, interests from the PIT, or Faces from the FIB, which controls the further processing of the packet based on the CCN packet type.

4. Depending on the packet type and the outcome of the post-processing, the incoming packet may be transmitted through one or more output Faces, a content packet from the CS may be transmitted through the input face, or the incoming packet may be dropped.

Figure 4:
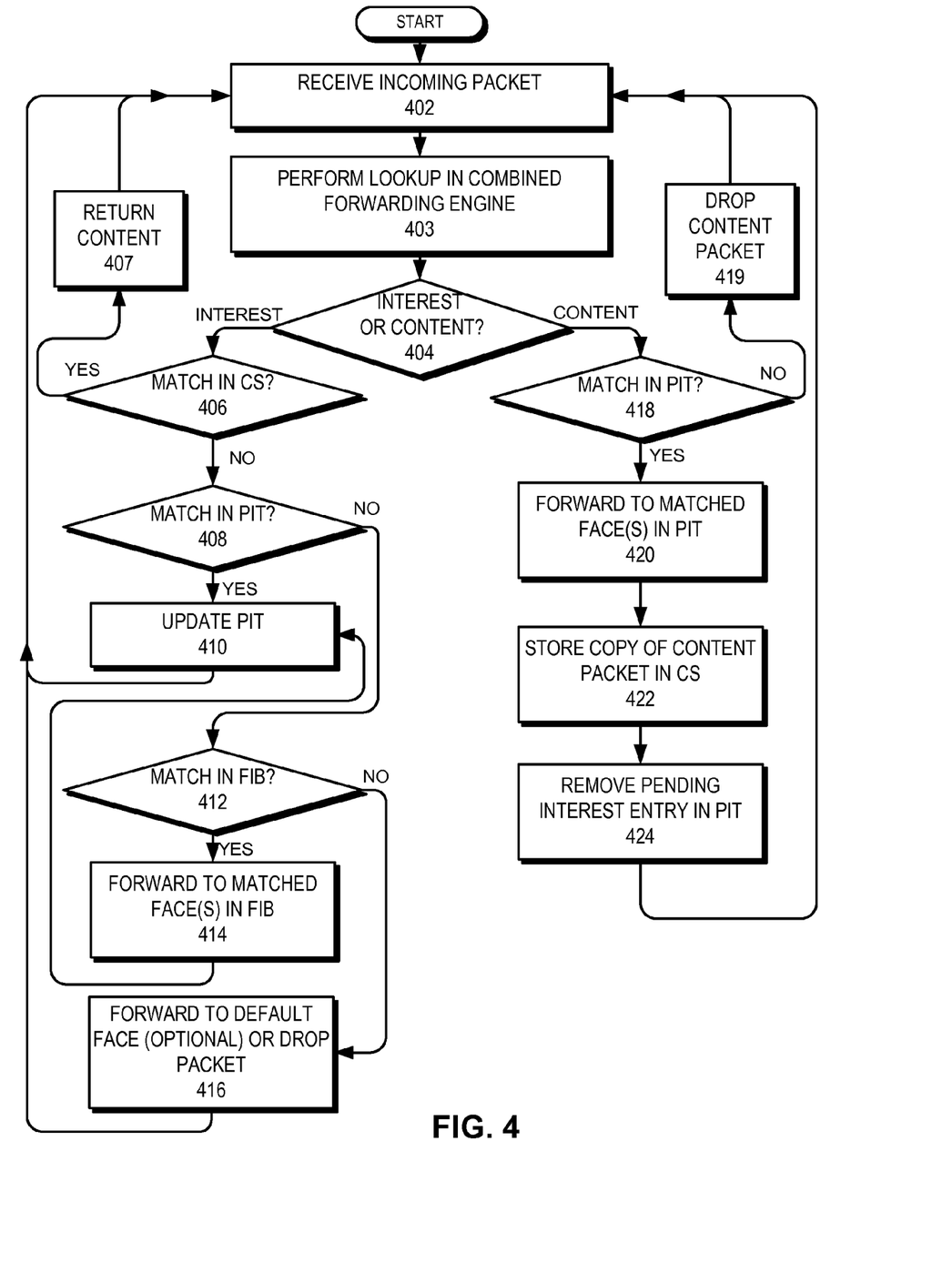
FIG. 4 presents a flowchart illustrating the operation of a CCN forwarding engine which incorporates the lookup entries of a content store, a pending interest table, and a forwarding information base, in accordance with an embodiment.

FIG. 4 presents a flowchart illustrating the operation of a combined CCN forwarding engine, in accordance with one embodiment of the present invention. During operation, the system receives an incoming packet (operation 402). The system then performs a lookup based on the packet's HSVLI in the combined forwarding engine, which involves simultaneous lookups through the entries for the CS, PIT, and FIB (operation 403). After the lookup is complete and results are obtained, the system determines whether the packet is an interest packet or a content packet based on the packet's header or payload information (operation 404). Note that the lookup results may contain content packets (corresponding to a CS match), pending interests (corresponding to a PIT match), and output Faces (corresponding to a FIB match).

If the received packet is an interest packet, the system further determines whether the lookup resulted in a CS match based on the lookup results (operation 406). If there is a CS match, a copy of the content (or a copy of one or more content packets) is returned to the source of the interest through the same Face on which the interest arrives (operation 407). If no match is found in the CS, the forwarding engine further determines whether there is already a pending interest for the same content in the PIT based on the corresponding PIT lookup result (operation 408). If there is a match in the PIT, the system updates the corresponding PIT entry to include the Face on which the interest arrives (operation 410), and continues to receive the next incoming packet.

If there is no match in the PIT for the interest packet, the system then determines whether there is a FIB match (operation 412). If there is a match, the system then forwards the interest packet to the matched Face(s) based on the FIB lookup (operation 414). The system further updates the PIT with the interest packet (operation 410) before receiving the next incoming packet. If no match is found in the FIB, the system can optionally forward the interest packet to a default Face, or drop the packet (operation 416).

If the received packet is a content packet (see operation 404), the system first determines whether there is a match in the PIT (operation 418). If there is no match in the PIT, which means that there is not pending interest for the incoming content packet, the system drops the content packet (operation 419). Optionally, the system can store a copy of the content packet in anticipation of future interest packets.

If there is a match in the PIT for the content packet, the system then forwards the content packet to the Face(s) based on the PIT match (operation 420). The system further stores a copy of the content packet in the CS (operation 422). Subsequently, the system removes the pending-interest entry in the PIT (operation 424).

Note that the above forwarding process which combines the lookup in CS, PIT, and FIB into one lookup process is only one way to implement a CCN forwarding engine. The forwarding process described in FIG. 3, although less optimized, can also be used. The description below provides more detail on how entries from each lookup table (i.e., CS, PIT, and FIB) are loaded into the common lookup engine.

FIB: In the FIB, each forwarding prefix is entered in the common CCN lookup engine once. Entries from the FIB have the lowest priority. Longest-prefix lookup is the preferred lookup method for the FIB. No other matching is required as post-processing after the FIB lookup.

PIT: The PIT is handled similarly to the FIB. Each pending interest prefix is entered in the common CCN lookup engine once. Entries from the PIT have the highest priority. A PIT longest-prefix match is followed by matching on the rest of the query terms in post-processing. For example, an optional query term restricting the publisher must be considered if present.

CS: For each content packet in the CS, an entry is added to the common lookup engine for every possible CCN prefix. Thus, there is a lookup engine entry under every possible prefix that could be queried to obtain any available content packet. Many content packets in the CS may share prefixes, so they would become multiple entries for the same CS entries in the common lookup engine. As with the PIT, the longest-prefix match is followed by matching on other terms such as the publisher. A query may also request content relative to a particular prefix in the tree of content names and this is ideally evaluated after the lookup to find a suitable match. Entries from the CS have the middle priority, lower than PIT entries but higher than FIB entries.

Content Packet: The initial lookup on the name in a content packet might result in one of the following matches (in decreasing order of priority):

PIT: If there is a pending interest match, then there is a consumer for this content packet that has not already been satisfied from something locally available in the CS. The forwarding engine can transmit the content packet on all Faces which are the source of the pending interest, enter the content packet in the CS, and remove the pending interest. Note that these steps involve changing the contents of the common lookup engine (and other data structures), but these steps can be done in the background rather than in real time.

CS: Since the CS entries are lower priority, a CS match implies that there is no pending interest in the content packet. Typically, this would terminate the packet processing to avoid consuming CS storage for undesired content. Alternatively, the forwarder could implement more liberal policies where the post-processing would determine whether a copy of the incoming content packet is already in the CS, and if not whether it should be added despite lack of interest.

FIB: A FIB match also implies that there is no pending interest in the content packet and the forwarder's actions are the same as for a CS match.

No Match: No match means that there is no pending interest in the content packet and the forwarder's actions are the same as for the CS match.

Interest Packet: The initial lookup on the prefix in an interest packet might result in one of the following matches (in decreasing order of priority):

PIT: A PIT match indicates that this query has already been forwarded. The incoming Face is added to the list of Faces for the pending interest and the expiry time is updated.

CS: A CS match indicates that there is no pending interest already in process but that there is local data to satisfy the incoming query. The matching content packet is transmitted through the incoming Face.

FIB: A FIB match indicates that there is neither a pending interest nor local content so the incoming interest is to be forwarded towards possible sources of the requested content. The interest packet is transmitted through each Face associated with the FIB match and is entered in the PIT with reference to the input Face. Note that this final step involves changing the contents of the common lookup engine but can be done in the background rather than on the main packet forwarding path.

False Match: The false matches in each lookup table are handled during post-lookup processing as follows:

PIT: A false match for a PIT entry could be a case where there is a pending interest with the relevant prefix (either from the name of a content packet or the prefix of an interest) but the interest is not actually a match due to other query terms. In this case, a new lookup on a shorter prefix could be performed to repeat the process while avoiding the false match. Alternatively, a slow path could use other data structures to implement the abstract forwarding algorithms directly. A false match for a PIT entry could also be a hash collision in which case a slow path is to be activated to use the CS and FIB data structures from which the common lookup engine was loaded.

CS: A false match for a CS entry could be a case where there is content in the content store that does not match all the query terms of an interest or is not identical to a content packet. In the case of an incoming interest packet, the query may be for content relative to the found content packet, so the false match result can be the input to a traversal of other CS data structures. In the case of an incoming content packet, the match from CS already indicates the absence of pending Interest, so the packet is either discarded or inserted in CS since it is not already present there. The false match could also be due to a hash collision, in which case a slow path must be activated to use the FIB data structures from which the common lookup engine was loaded.

FIB: Since the FIB operates on prefix matching alone, it is not possible to have a false match on a FIB entry based on query terms. It is possible to have a hash collision. For CCN, unlike IP, it does not hurt to forward an interest packet unnecessarily through Faces that cannot be expected to satisfy it, except for the cost of some wasted bandwidth. What is essential is that the correct destinations be in the list. For this reason, it is acceptable to ignore possible hash collisions on FIB entries. It is also possible to check and activate a slow path using the FIB data structures from which the common lookup engine was loaded.

Figure 5:
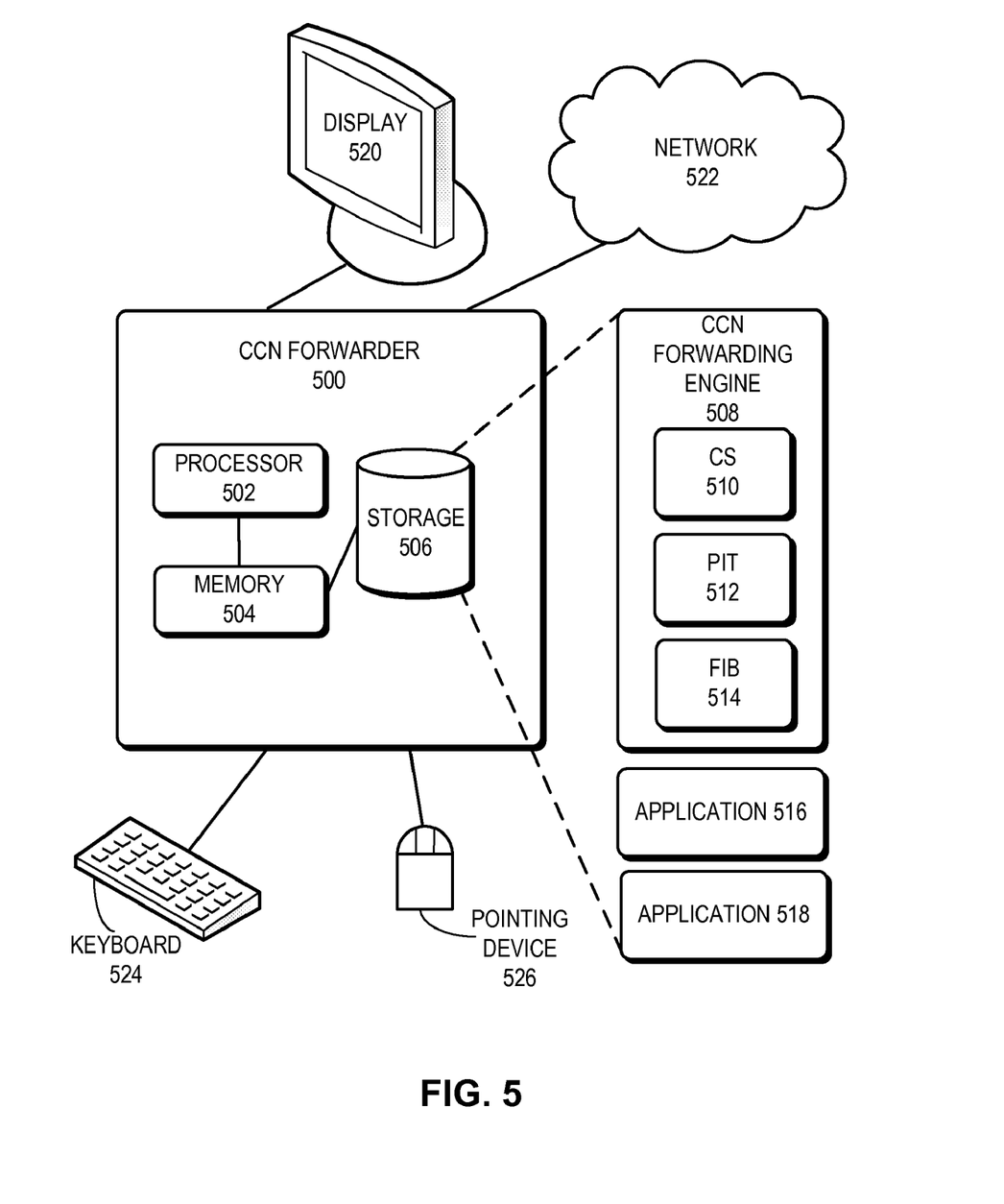
FIG. 5 presents an exemplary CCN forwarder in accordance with an embodiment.

FIG. 5 presents an exemplary CCN forwarder in accordance with an embodiment. In this example, a CCN forwarder 500 includes a processor 502, a memory 504, and a storage 506. CCN forwarder 500 is coupled to a network 522, and is optionally coupled to a display 520, a keyboard 524, and a pointing device 526. Storage 506 stores computer instructions for a CCN forwarding engine 508, as well as applications 516 and 518. CCN forwarding engine 508 further includes a CS 510, a PIT 512, and an FIB 514. During operation, the instructions for CCN forwarding engine 508 are loaded into memory 504 and executed by processor 502 to perform the aforementioned functions.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for facilitating forwarding a packet, the method comprising:
   receiving, by a computer, a packet with a hierarchically structured variable-length identifier (HSVLI);
   performing a lookup at a forwarding engine based at least on the packet's HSVLI;
      wherein the forwarding engine is implemented using a hardware-based exact-match lookup engine, a hardware-based longest-prefix-match lookup engine, or both; and
      wherein performing the lookup comprises searching for matches against at least one of: a content store, a pending interest table, and a forwarding information base;
   making a forwarding decision based on the lookup; and
   in response to the packet containing an interest for a piece of content and the lookup resulting in a match in a pending interest table but not a match in a content store, updating the pending interest table to include the packet's input interface with the corresponding pending interest entry.

2. The method of claim 1, wherein the HSVLI indicates a piece of content and is hierarchically structured, comprising contiguous components ordered from a most general level to a most specific level; and
   wherein the length of a respective identifier is not fixed.

3. The method of claim 1, wherein the forwarding engine includes a lookup table containing entries from the content store, pending interest table, and forwarding information base.

4. The method of claim 1, further comprising determining whether the packet contains an interest or a piece of content corresponding to the HSVLI.

5. The method of claim 1, wherein in response to the packet containing an interest for a piece of content and the lookup resulting in a match in a content store, the method further comprises:
   transmitting a piece of content previously stored in the content store to the source of the interest.

6. The method of claim 1, wherein in response to the packet containing an interest for a piece of content and the lookup resulting in a match in a forwarding information base but not a match in a content store or a pending interest table, the method further comprises forwarding the packet to one or more interfaces corresponding to the match in the forwarding information base.

7. The method of claim 1, wherein in response to the packet containing a piece of content and the lookup resulting in a match in a pending interest table, the method further comprises:
   forwarding the packet to an interface corresponding to the match in the pending interest table;
   storing a copy of the packet in a content store; and
   removing a corresponding pending interest in the pending interest table.

8. A system for forwarding a packet, the system comprising:
   a processor;
   a memory;
   a receiving mechanism configured to receive a packet with a hierarchically structured variable-length identifier (HSVLI);
   a lookup mechanism configured to perform a lookup at a forwarding engine based at least on the packet's HSVLI;

wherein the forwarding engine is implemented using a hardware-based exact-match lookup engine, a hardware-based longest-prefix-match lookup engine, or both; and wherein while performing the lookup, the lookup mechanism is configured to search for matches against at least one of: a content store, a pending interest table, and a forwarding information base; and a forwarding mechanism configured to make a forwarding decision based on the lookup;

wherein in response to the packet containing an interest for a piece of content and the lookup resulting in a match in a pending interest table but not a match in a content store, the forwarding engine is configured to update the pending interest table to include the packet's input interface with the corresponding pending-interest entry.

9. The system of claim 8, wherein the HSVLI indicates a piece of content and is hierarchically structured, comprising contiguous components ordered from a most general level to a most specific level; and wherein the length of a respective identifier is not fixed.

10. The system of claim 8, wherein the forwarding engine includes a lookup table containing entries from the content store, pending interest table, and forwarding information base.

11. The system of claim 8, further comprising a determination mechanism configured to determine whether the packet contains an interest or a piece of content corresponding to the HSVLI.

12. The system of claim 8, wherein in response to the packet containing an interest for a piece of content and the lookup resulting in a match in a content store, the forwarding mechanism is configured to transmit a piece of content previously stored in the content store to the source of the interest.

13. The system of claim 8, wherein in response to the packet containing an interest for a piece of content and the lookup resulting in a match in a forwarding information base but not a match in a content store or a pending interest table, the forwarding mechanism is configured to forward the packet to one or more interfaces corresponding to the match in the forwarding information base.

14. The system of claim 8, wherein in response to the packet containing a piece of content and the lookup resulting in a match in a pending interest table, the forwarding mechanism is configured to forward the packet to an interface corresponding to the match in the pending interest table; and the forwarding engine is configured to:
store a copy of the packet in a content store; and
remove a corresponding pending interest in the pending interest table.

15. A storage device storing instructions which when executed by a computer cause the computer to perform a method for facilitating forwarding a packet, the method comprising:

receiving a packet with a hierarchically structured variable-length identifier (HSVLI);

performing a lookup at a forwarding engine based at least on the packet's HSVLI;

wherein the forwarding engine is implemented using a hardware-based exact-match lookup engine, a hardware-based longest-prefix-match lookup engine, or both; and wherein performing the lookup comprises searching for matches against at least one of: a content store, a pending interest table, and a forwarding information base;

making a forwarding decision based on the lookup; and in response to the packet containing an interest for a piece of content and the lookup resulting in a match in a pending interest table but not a match in a content store, updating the pending interest table to include the packet's input interface with the corresponding pending-interest entry.

16. The storage device of claim 15, wherein the HSVLI indicates a piece of content and is hierarchically structured, comprising contiguous components ordered from a most general level to a most specific level; and wherein the length of a respective identifier is not fixed.

17. The storage device of claim 15, wherein the forwarding engine includes a lookup table containing entries from the content store, pending interest table, and forwarding information base.

18. The storage device of claim 15, wherein in response to the packet containing an interest for a piece of content and the lookup resulting in a match in a content store, the method further comprises:

transmitting a piece of content previously stored in the content store to the source of the interest.

* * * * *